(No Model.)
G. H. NOTT.
METHOD OF PURIFYING HARD WATER.
No. 304,123. Patented Aug. 26, 1884.
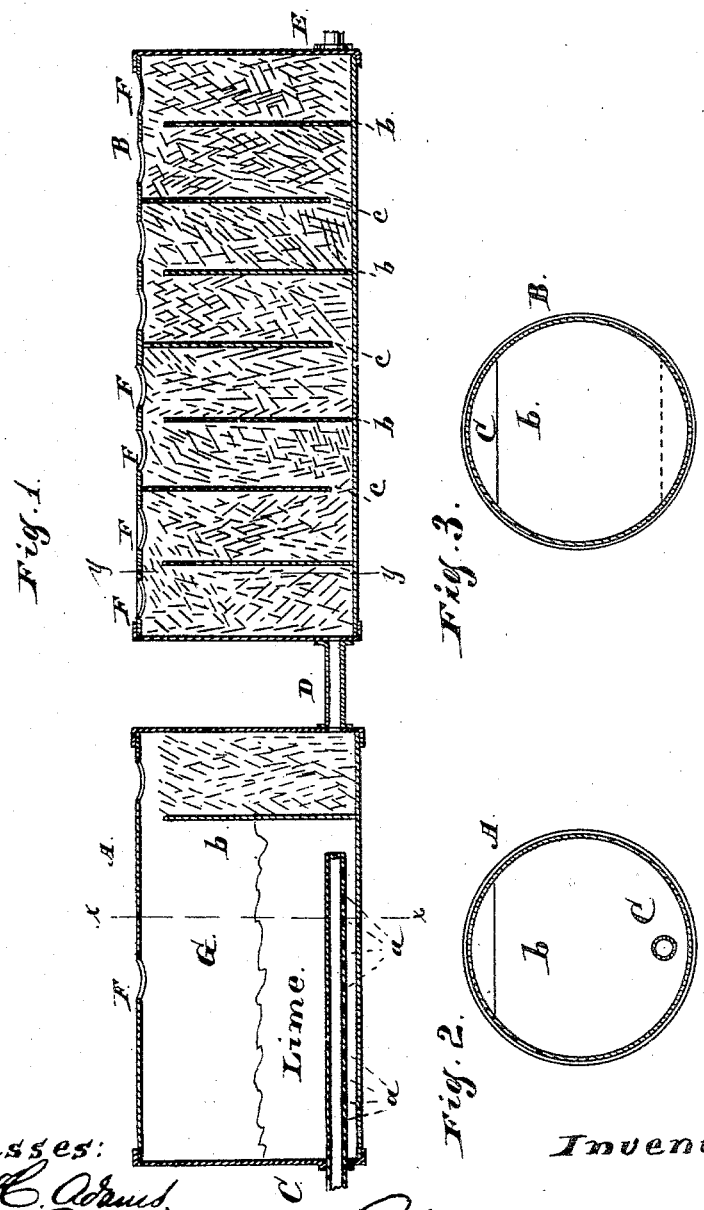

UNITED STATES PATENT OFFICE.

GORDON H. NOTT, OF CHICAGO, ILLINOIS, ASSIGNOR, BY MESNE ASSIGN-MENTS, OF ONE-FOURTH TO JAMES H. RAYMOND, OF SAME PLACE.

METHOD OF PURIFYING HARD WATER.

SPECIFICATION forming part of Letters Patent No. 304,123, dated August 26, 1884.

Application filed February 23, 1882. (No model.)

*To all whom it may concern:*

Be it known that I, GORDON H. NOTT, residing at Chicago, in the county of Cook and State of Illinois, and a citizen of the United States, have invented certain new and useful Improvements in Devices for and Methods of Purifying Lime or Hard Water, of which the following is a full description, reference being had to the accompanying drawings, in which—

Figure 1 is a vertical longitudinal section of the feed or lime chamber and the filter; Fig. 2, a cross-section on line *x x* of Fig. 1; Fig. 3, a cross-section on line *y y* of Fig. 1.

The use of hard water, or water holding lime in solution in steam-boilers, causes many difficulties, and is to some extent dangerous by reason of the incrustations formed therein and on the interior parts, as is well known.

The object of this invention is to overcome the greater portion of the difficulties which attend the use of water containing the soluble bicarbonate of lime by treating the water before it enters the boiler, so that it will not form incrustations when subjected to heat and pressure and to a reduction of volume by evaporation, causing concentration; and its nature consists in providing and employing a suitable vessel for a feed-chamber, into which substantially all of the water to be treated enters, and passes through or comes in contact with quicklime or unslaked burnt lime before passing out, and in the combinations of parts hereinafter set forth and claimed as new.

In the drawings, A B indicate a suitable tank, made in two compartments; C, D, and E, tubes or pipes; F, openings or man-holes; G, the lime-chamber; *a*, perforations on the under side of the pipe C; *b c*, partitions, arranged as shown, for reversing the current of the water as it passes through the filtering-tank or filtering material.

As shown, the tank is made in two parts, A and B, connected by a tube or pipe, D. This will be found the most convenient way of making the tank; but it is evident that the parts shown as sections A and B may be made into one and the connecting-pipe D omitted. In such case it will be understood that the adjoining ends or heads are also to be omitted.

I have designed and constructed my apparatus mainly for the purpose of purifying the water at railway-stations for locomotive-engines, and for this purpose I have found tanks made sixteen feet in length and from eight to ten feet in diameter, made of staves in the circular form shown, to answer well for the purpose, although it is evident that the size may be increased or diminished according to the amount of water required at any station; and my improvements will also be found useful in purifying water for stationary boilers, in which case it will not be required to have the capacity necessary for a railway-station.

The supply-pipe C enters the lime-chamber G and traverses nearly or quite its length, and it is perforated on the under side to prevent the water, in passing from it into the lime-chamber, from forcing the lime away or escaping contact with the lime. This supply-pipe is connected either with an elevated tank or with a pump, for the purpose of giving some pressure to the water. The pressure which I have found best is that of about two atmospheres, which the wooden tank A B, being thoroughly hooped, is well qualified to receive without leakage; or by making the tank of boiler-iron or other suitable material greater pressure could be had with safety; but usually it would not be found essential. The water, when purified, passes out at the pipe E, which conducts it to the tank or well from which it is to be taken for use. The pipes C and E are to be provided with stop-cocks, so that the flow of water can be regulated or cut off as desired. The pipe D, when used, may also be similarly provided. The space between the partitions *b* and *c* and the ends or heads of the tank in the filtering part of the device are to be filled with straw, hay, or other material which will permit a rapid passage of the water and retain or hold back the lime or other solid matters contained in the water. The use of such coarse and free filtering material permits a rapid flow of the water, so that a large quantity can be worked off, and it is easily taken out or replaced through the man-holes F whenever it becomes foul or inefficient in its action.

In operation burnt lime is placed in the chamber G through its man-holes in a sufficient quantity to cover the pipe C several inches. The water is then carefully let on until the tank is filled, after which it may be permitted to flow under full head. By placing the perforations $a$ of the pipe C on the under side, the water in entering, if it acquires any considerable force, strikes against the bottom of the tank, and its force is so far dissipated that it will not scatter or drive the lime away; and by keeping the lime in position substantially all of the water passes through it or in contact with it, and there is sufficient air in the water or in the tank to slake the lime placed in the chamber. By bringing substantially all of the water in contact with the burnt lime, the carbonic-acid gas which it may contain, and which is always found in water that has not been distilled or caught, as rain-water, is absorbed by the lime, and the soluble bicarbonate of lime is changed to the insoluble carbonate and in a condition to be filtered out, so as to leave the water which issues from the exit E almost free of lime, and purified from all earthy matters, which leaves it in such a condition that it will not cause incrustations in boilers (as I have found out by conducting experiments on a large scale) for a considerable length of time; and by depriving the water of its carbonic-acid gas there is nothing left by which the incrustations (carbonate of lime) can be formed, even though some or all of the lime held in solution should fail to be precipitated. Whenever the action of the lime-chamber becomes somewhat impaired, or whenever desired, additional quantities of lime may be placed therein from time to time without removing the old, as a very considerable quantity of lime in the chamber G will not injure or impede its operation, and whenever desired the lime can be all removed and new lime placed therein; but this will not be necessary for very frequent periods. By taking more time a pressure or flow only sufficient to cause the water to pass along will produce good results. By placing the burnt lime into the vessel or receptacle before it is slaked, the body of water in which it becomes immersed prevents the lime from becoming heated, and retards its conversion into a hydrate and its outflow from the receptacle; and the tube C may be so formed or applied as to leave a small sub-chamber at the bottom of the chamber G.

I am aware that lime has heretofore been applied to a small body or stream of water to be united with a larger one by a process known as "Clark's process," and I do not therefore claim, broadly, the application of quicklime or the hydrate of lime to water containing lime in native solution; but I understand my process to be radically different from Clark's, as I treat the whole body of water, as the first step, by passing it through or in contact with a sufficient quantity of calcined lime to enable nature to reform its combinations and to apply the exact quantity of such element required, and also to absorb all of the free carbonic anhydride (acid) from the water, so as to prevent the formation of incrustations when the water is subjected to heat and evaporation under pressure, with a resulting tendency to condense or concentrate the mineral matters of the water, while the Clark process depends for its success in steam-boilers upon the knowledge of the character of the specific water to be treated and the skill of the mixer, which makes that process too uncertain and unreliable for use in connection with steam-boilers or other places where the vapors and gases are held under pressure.

What I claim as new, and desire to secure by Letters Patent, is as follows:

1. The herein-described method or process of extracting carbonic acid (anhydride) and bicarbonate of lime from hard water to render the water soft and prepare it for use in steam-generators, which consists in placing burnt lime in the lime-receptacle before reducing it to a hydrate, and causing the entire stream or body of water to be purified to flow under pressure through the receptacle, and through the lime in bulk and in a quiescent state, and then subjecting the stream to filtration, all by a continuous or non-intermitting process, substantially as specified.

2. A lime-vessel having one or more chambers containing filtering material, combined with a water-supply pipe in close proximity to its base, and having a series of perforations confronting said base, substantially as set forth.

3. A lime-vessel combined with a water-supply pipe in close proximity to its base, and having a series of perforations confronting said base, substantially as set forth.

GORDON H. NOTT.

Witnesses:
ALBERT H. ADAMS,
O. W. BOND.